Dec. 9, 1952     H. DAHL ET AL     2,621,021

VEHICLE JACK

Filed July 8, 1950

Inventors
HUGO DAHL
ARTHUR SEVERSON
Gerald P. Welch
Attorney

Patented Dec. 9, 1952

2,621,021

UNITED STATES PATENT OFFICE 2,621,021

VEHICLE JACK

Hugo Dahl and Arthur Severson, Milwaukee, Wis.

Application July 8, 1950, Serial No. 172,634

1 Claim. (Cl. 254—86)

This invention relates to improvements in vehicle jacks, and more particularly to a novel vehicle jack of the lazy tongs variety.

An object of the invention is to provide a device of the type which will quickly and easily raise one or both ends of a vehicle for the purpose of freeing the wheels thereof or of changing the tires thereon.

Another object of the invention is to provide a device of the type which will effect a relatively greater lateral stability of the vehicle than is possible with similar devices heretofore developed.

Another object of the invention is to provide a vehicle jack in an out-of-the-way position on the vehicle when not in use, and which will not be objectionable as to appearance.

Other and further objects of the invention will be apparent as the description proceeds, reference being had to the accompanying drawing, in which.

Figure 1:
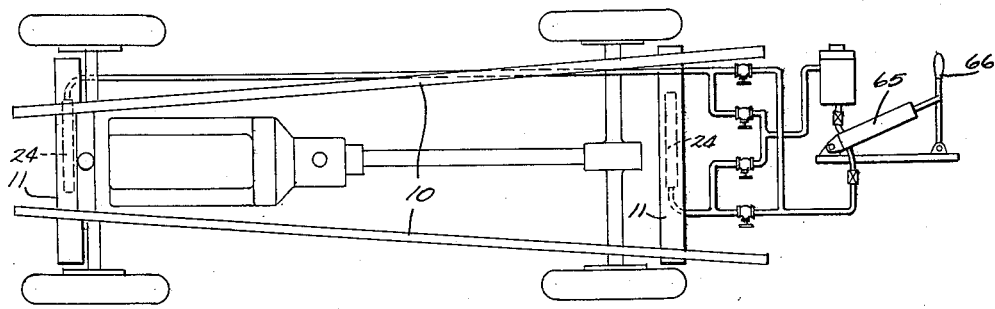
Fig. 1 is a plan view of a portion of a vehicle chassis equipped with a pair of vehicle jacks embodying the invention.
Figure 2:
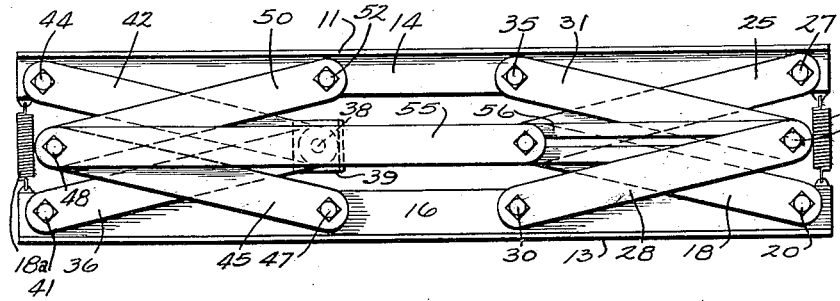
Fig. 2 is a side view in elevation of a jack.
Figure 3:
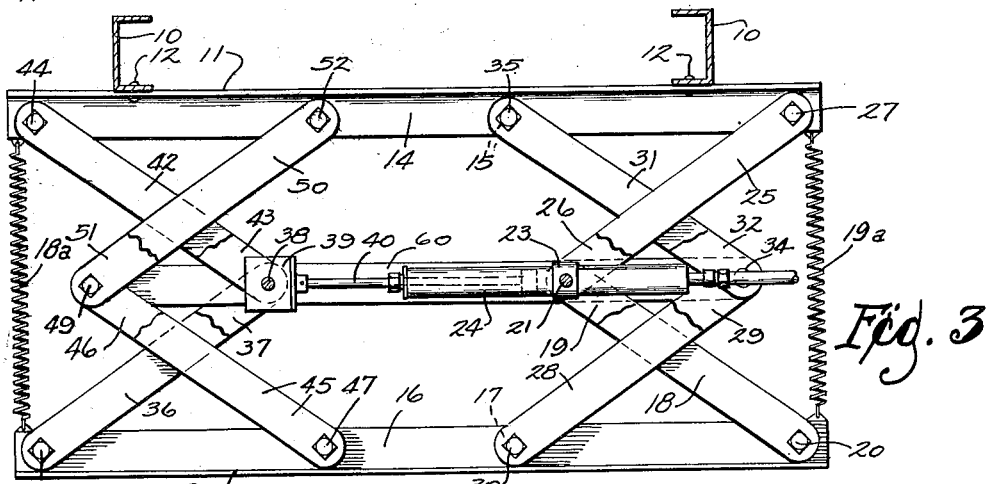
Fig. 3 is a side view in elevation partially broken away of a jack in expanded position.
Figure 4:
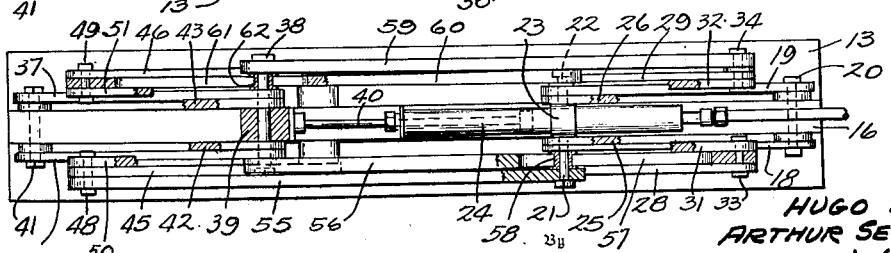
Fig. 4 is a plan view of the jack partly in section and partly in elevation.

Referring more particularly to the drawing, the numeral 10 refers to a vehicle frame to which a support plate 11 is affixed by means 12. A base plate 13 provides a ground-bearing portion of the device. The support plate 11 has a central longitudinal bar member 14 fixed thereto which is apertured as at 15 to provide for pivotal connection therewith of the lazy tongs cross links. The base plate 13 has a similar longitudinal bar member 16 which is also spacedly apertured as at 17 to accommodate means for pivotal connection thereto of the cross links of said lazy tongs. A pair of coil springs 18a and 19a connect the opposite ends of the support plate 11 and the base plate 13 and serve to compress the assembly and retain it in normal withdrawn position up under the vehicle frame 10.

A pair of cross links 18 and 19 are connected at their lower ends with the bolt 20 journaled in the bar 16. At their upper ends cross-links 18 and 19 are pivotally attached to the bolts 21 and 22 fixed in the collar 23 embracing the hydraulic cylinder 24.

A pair of cross-links 25 and 26 are connected at their lower ends to the bolts 21 and 22 and at their upper ends to the bolt 27 in one end of the bar member 14.

A pair of cross links 28 and 29 are connected pivotally to the bolt 30 in the longitudinal bar 16 at their lower ends, and at their upper ends are pivotally connected respectively to cross links 31 and 32 by means of the bolts 33 and 34, and the upper ends of cross links 31 and 32 are connected by the bolt 35 to the bar member 14.

A pair of cross links 36 and 37 are pivotally connected at their lower ends with the bolt 41 in the bar 16 and at their upper ends with the bolt 38 running through the block 39 connected to the piston rod 40. A pair of cross links 42 and 43 are pivotally connected at their lower ends with the bolt 38 and at their upper ends with the bolt 44 in the bar 14.

A pair of cross links 45 and 46 are pivotally connected with the bolt 47 in the bar 16 at their lower ends, and at their upper ends are connected by bolts 48 and 49 to the upper cross links 50 and 51 which latter are connected by bolt 52 to the bar 14. It will thus be seen that two pairs of lazy tongs are connected at each end between the base plate 13 and the support plate 11, and that the piston 40 and cylinder 24 act centrally longitudinally between the bolts 38 and 21 of the adjacent across links. A bar 55 connects the bolt 48 and the bolt 21 and a bar 56 connects the bolt 38 and the bolt 33, the bar 56 being slotted as at 57 to accommodate a spool 58 on the bolt 21. A bar 59 connects the bolts 34 and 38, and a bar 60 connects the bolts 22 and 49 and is slotted as at 61 to accommodate the spool 62 on the bolt 38. The spool 58 is movable freely horizontally through slot 57 and serves to maintain bolt 21 in horizontal alignment with bolt 33, and spool 62 movable similarly within the slot 61 maintains horizontal alignment of bolts 38, 22 and 49.

In use, the assembly is normally held withdrawn upwardly by means of the coil spring 18a and 19a. A pump 65 having the operating handle 66 may be employed to energize the cylinder 24 of either or both of the jacks attached to the frame 10. Pressure in the cylinder 24 will cause an equal pressure against the block 39 and the collar 23 and the bolts 38 and 21, thus causing the several lazy tongs to expand and raise the vehicle.

It will be understood that the device is capable of various modifications in structure and design without departing from the spirit of the invention, within the scope of the appended claim.

Having thus described the invention, what is claimed and desired to be secured by Letters Patent of the United States is:

A lifting jack assemblage for vehicles comprising a top member permanently secured to an end area of the vehicle, said top member having a major longitudinal dimension and being mounted on the vehicle with the longitudinal length extending in the direction of width of the vehicle, a pair of linkage assemblies of lazy-tong type each having the upper free ends of their respective linkage members secured to the top member with the respective linkage assemblies positioned in end areas of the top member and spaced apart a fixed distance, a movable supporting member of equal longitudinal length to the top member carried by the opposite free ends of the respective linkage assemblies with the ends positioned on the latter member in similar relation thereto and symmetrically to the positions of the first free ends to the top member, each linkage assembly having its linkage divided into two sets of link elements positioned in laterally aligned and parallel relation and spaced apart, with the members of a set connected by bolts and having at least one of the bolts of a set of linkage elements being common to and mounted in connected relation to both sets of one of the linkage assemblies, other bolts of such assembly being individual to the set, and means including a piston and cylinder assembly for operatively connecting the linkage assemblies, the piston and cylinder being operatively connected with the common bolt at the junction points of the similar connected links of one linkage member at one end of the assemblage, such linkage member having the free ends of its links positioned outermost in such assemblage end, the piston and cylinder assembly having an operative connection with the junction points of similar members of the opposite linkage assembly having their free ends of the connected links outermost in the opposite end of the assemblage, said means being positioned symmetrically relative to a vertical plane extending intermediate the sets of the linkage assemblies, said means moving and being movable with said junction points during the expanding movement of the jack, said means also including connecting elements between the junction points of the other member of the sets and the piston and cylinder assembly to thereby apply similar movements to both linkage assemblies concurrently, said top and movable supporting members having spring connections at their opposite ends for collapsing the linkage assemblies.

HUGO DAHL.
ARTHUR SEVERSON.

REFERENCES CITED

The following references are of record in the file of this patent:

UNITED STATES PATENTS

| Number | Name | Date |
| --- | --- | --- |
| 1,580,318 | Nordenskjold | Apr. 13, 1926 |
| 1,896,977 | Sessions | Feb. 7, 1933 |
| 2,008,553 | Keller | July 16, 1935 |
| 2,132,343 | Jarrett | Oct. 4, 1938 |
| 2,218,733 | Watts | Oct. 22, 1940 |
| 2,427,808 | Pluta et al. | Sept. 23, 1947 |